US006416039B1

(12) United States Patent
Pietrusynski

(10) Patent No.: US 6,416,039 B1
(45) Date of Patent: Jul. 9, 2002

(54) HYDRAULIC FLOOR JACK WITH STABILIZING STRUCTURE

(76) Inventor: Martin S. Pietrusynski, 4001 W. Loomis Rd., Milwaukee, WI (US) 53221

( * ) Notice: Subject to any disclaimer, the term of this patent is extended or adjusted under 35 U.S.C. 154(b) by 0 days.

(21) Appl. No.: 09/626,183

(22) Filed: Jul. 27, 2000

(51) Int. Cl.[7] .................................................. B60P 1/48

(52) U.S. Cl. .................... 254/8 B; 254/2 B; 254/93 H; 254/DIG. 1

(58) Field of Search ................................ 254/2 B, 8 B, 254/DIG. 1, DIG. 4, 93 R, 131, 30, 133, 134; 280/47.16

(56) References Cited

U.S. PATENT DOCUMENTS 1,570,071 A * 1/1926 Mercier ...................... 254/8 B
2,433,900 A * 1/1948 Grime ........................ 254/8 B
4,210,314 A * 7/1980 Carroll et al. .............. 254/8 R
4,277,048 A * 7/1981 Okuda ........................ 254/8 B
4,365,786 A * 12/1982 Osteen ........................ 254/30
5,181,821 A * 1/1993 King, Sr. ................ 254/133 R
5,984,270 A * 11/1999 Hussaini et al. ............ 254/8 B
6,089,545 A * 7/2000 Norman et al. ............. 254/134

* cited by examiner

*Primary Examiner*—Joseph J. Hail, III
*Assistant Examiner*—Lee Wilson
(74) *Attorney, Agent, or Firm*—Donald J. Ersler

(57) ABSTRACT

A floor jack with stabilizer structure includes a floor jack, a stabilizer structure, a return device, a removable lifting lever, a safety pin and a platform assembly. The floor jack has a hydraulic cylinder for lifting automobiles and is commonly available from any retail store selling automobile parts and accessories. The stabilizer structure extends from the sides and front of the floor jack. Preferably, at least three screw jacks are threadably engaged with the stabilizer structure to provide stability not available from wheels. The return device causes the lifting lever to return to an upright position after depressing thereof. At least one hole is formed through a lifting ram of a floor jack. The at least one hole is sized to receive a safety pin which is inserted therethrough to prevent injury from a hydraulic cylinder failure. A platform assembly is attached to a support member of the floor jack. The platform assembly preferably has at least two eye bolts extending from the sides thereof. A ratchets strap may be attached to the at least two eye bolts to retain a load placed on a platform of the platform assembly.

22 Claims, 3 Drawing Sheets

HYDRAULIC FLOOR JACK WITH STABILIZING STRUCTURE

BACKGROUND OF THE INVENTION

1. Field of the Invention

The present invention relates generally to floor jacks and more specifically to a floor jack with stabilizing structure which allows unstable loads to be elevated without tipping over the jack.

2. Discussion of the Prior Art

Currently, automotive floor jacks may not be used to lift an unstable load such as a motorcycle. A prior art automotive floor jack may not be used to lift an unstable load, because it has too small a lift area and may tip over. Even if a special platform is attached to the lifting portion of the floor jack, a small shift applied to the unstable load would cause the floor jack to tip over. Further, a standard floor jack would be inconvenient for lifting an unstable load, because the lifting lever requires at least one hand to move thereof. Moving the lifting lever with one hand would not allow the operator to stand-up and hold the load with both hands.

Accordingly, there is a clearly felt need in the art for a floor jack which has a stabilizing structure to prevent tip covers, a lifting lever which may be operated by a single foot, a platform for securely lifting the bottom of an unstable load, and a safety pin for preventing injury in the event of a hydraulic cylinder failure.

SUMMARY OF THE INVENTION

The present invention provides a floor jack with stabilizing structure which may be operated by a single person to elevate an unstable load. The floor jack with stabilizer structure includes a floor jack, a stabilizer structure, a return device, a lifting lever, a safety pin and a platform assembly. The floor jack is the same type of hydraulic cylinder floor jack used for lifting automobiles and is commonly available from any retail store selling automobile parts and accessories. The stabilizer structure extends from the sides and front of the floor jack. Preferably, at least three screw jacks are thread ably engaged with the stabilizer structure to provide stability not available from wheels. One end of the return device is attached to the floor jack base and the other end to a lifting socket. The return device causes the lifting lever to return to an upright position after depressing thereof. At least one hole is formed through a lifting ram of the floor jack. The at least one hole is sized to receive a safety pin which is inserted through the lifting ram to prevent injury from a hydraulic cylinder failure. A platform assembly is attached to a support member of the floor jack. The platform assembly preferably has at least two eye bolts extending from the sides thereof. A ratchets strap may be attached to the at least two eye bolts to retain a load placed on the platform assembly.

Accordingly, it is an object of the present invention to provide a floor jack with stabilizing structure which may be used to lift an unstable load.

It is a further object of the present invention to provide a floor jack with stabilizing structure with a return device which allows the lifting lever to be actuated with one foot, leaving both hands available for manipulating an unstable load.

Finally, it is another object of the present invention to provide a floor jack with stabilizing structure which has at least two wheels which allow thereof to be moved around like a dolly.

These and additional objects, advantages, features and benefits of the present invention will become apparent from the following specification.

DETAILED DESCRIPTION OF THE PREFERRED EMBODIMENTS

Figure 1:
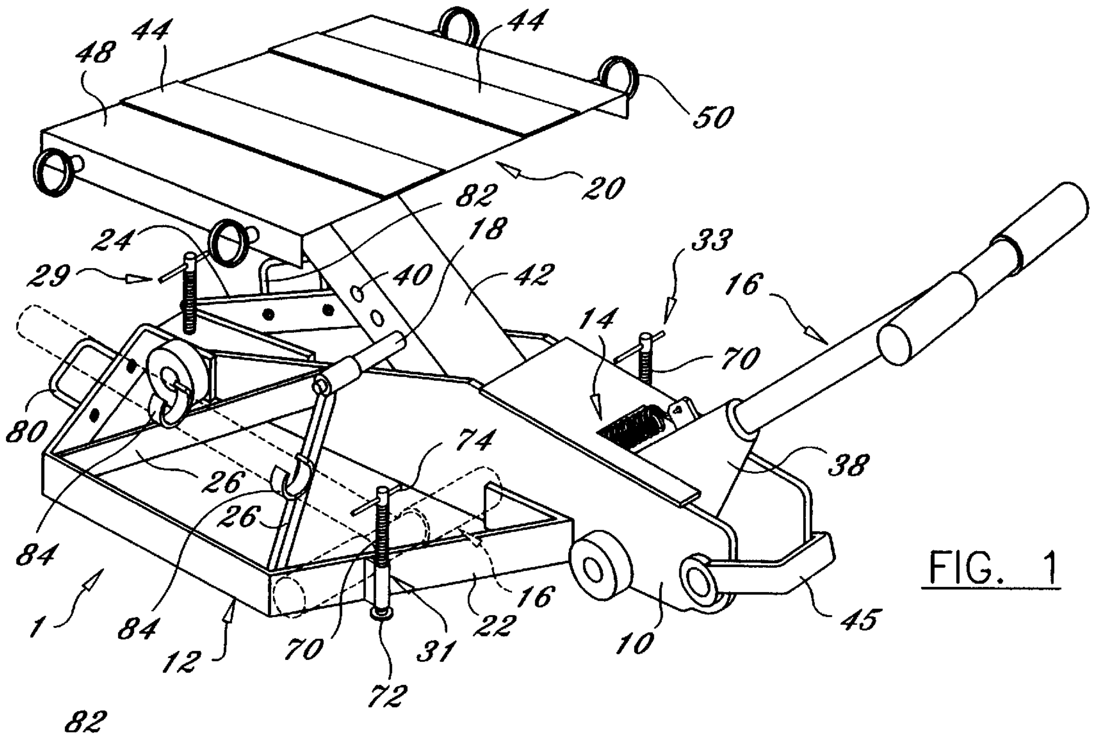
FIG. 1 is a perspective view of a floor jack with stabilizing structure in accordance with the present invention.
Figure 2:
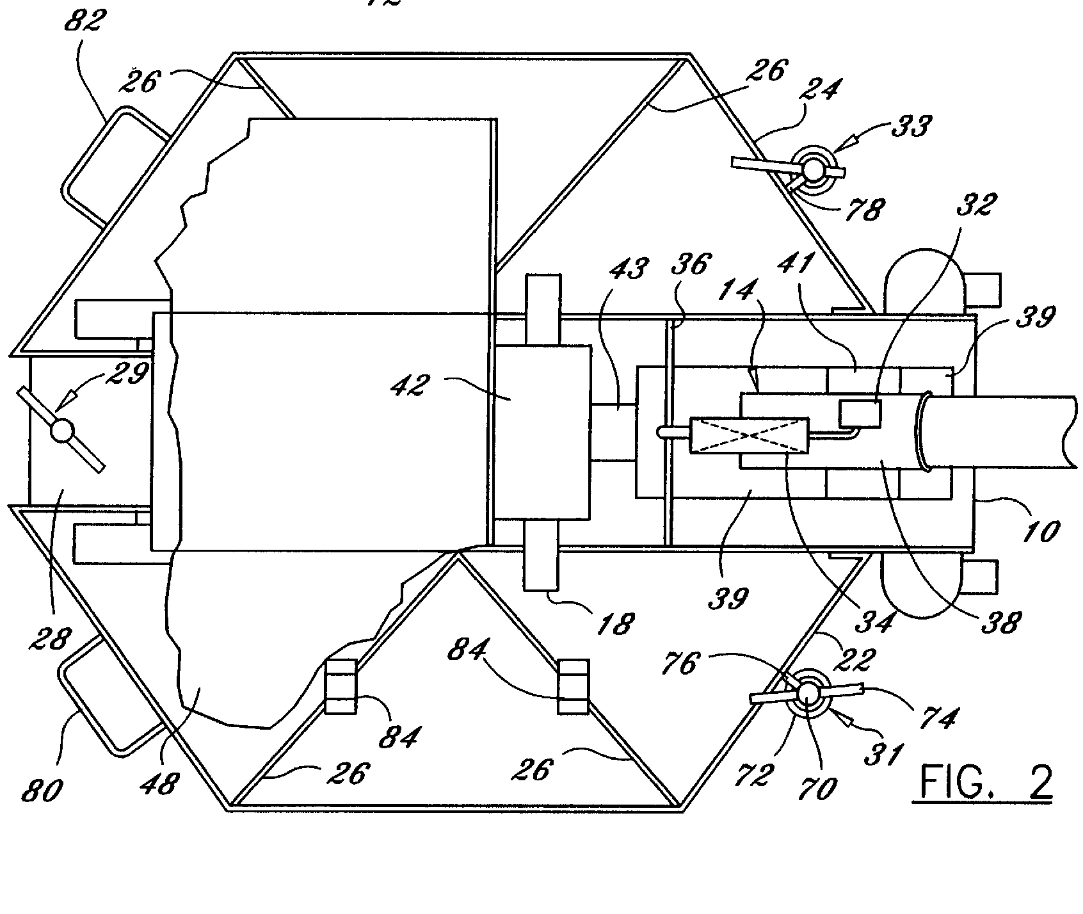
FIG. 2 is a top view of a floor jack with stabilizing structure in accordance with the present invention.
Figure 3:
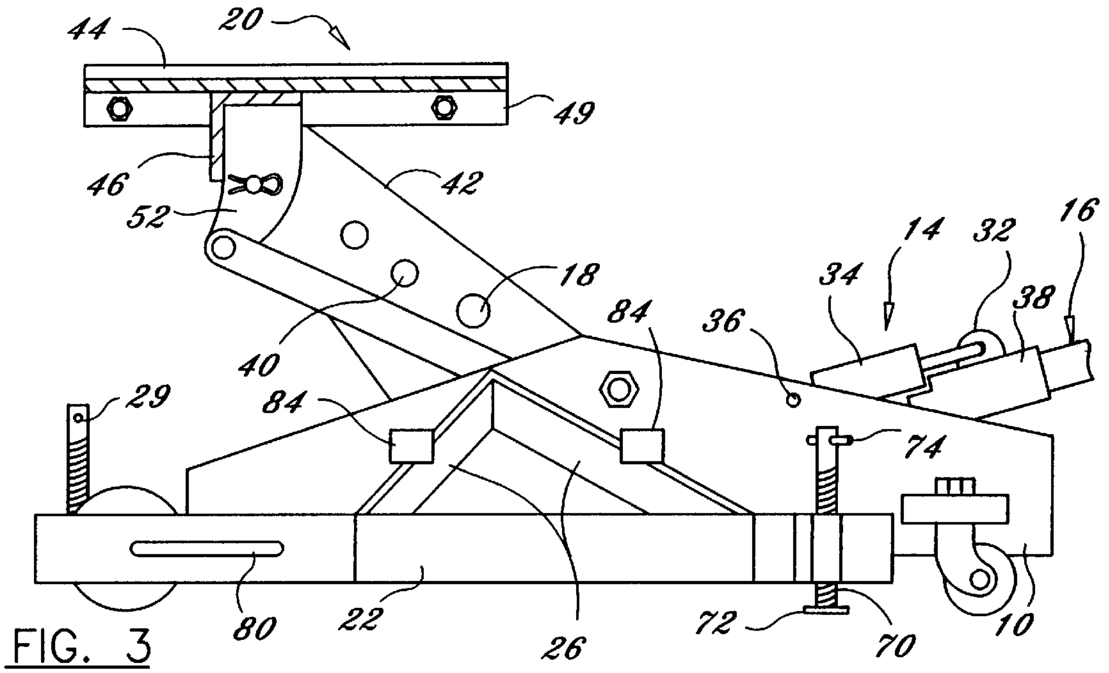
FIG. 3 is a side view of a floor jack with stabilizing structure in accordance with the present invention.
Figure 4:
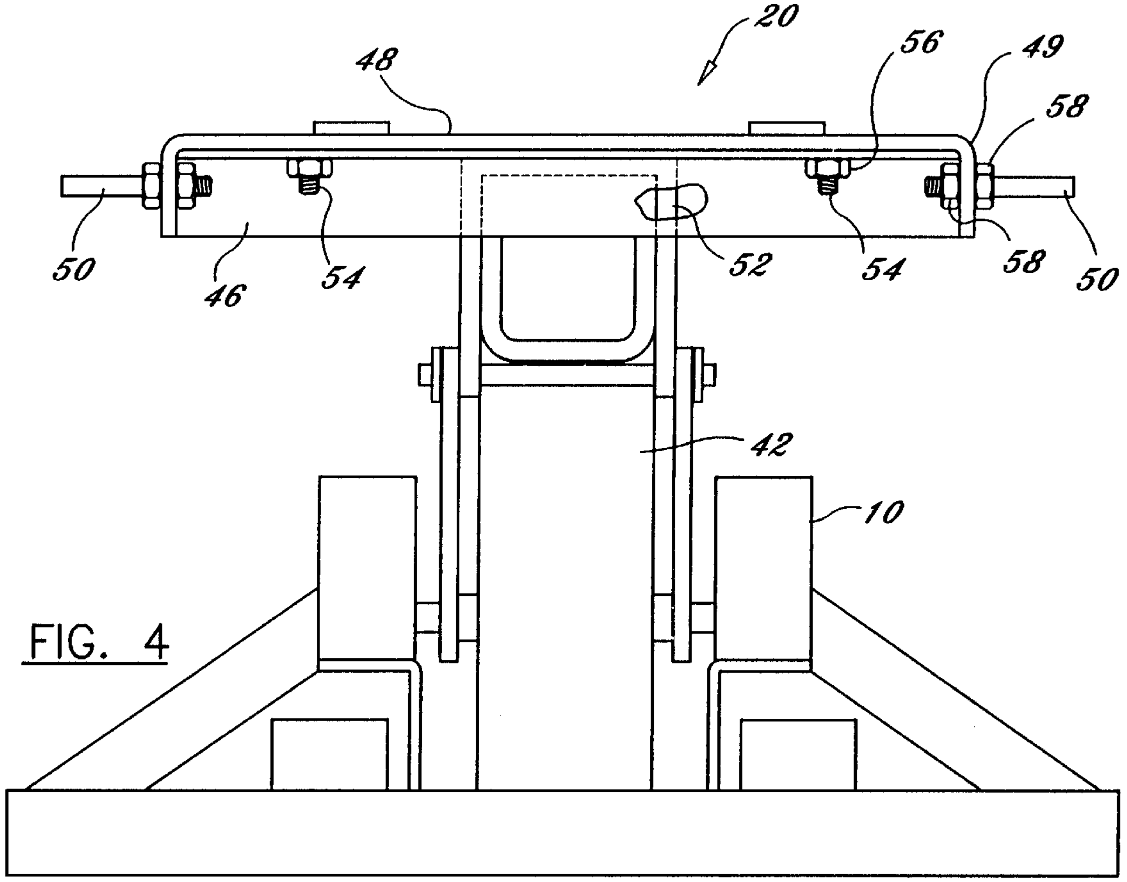
FIG. 4 is a front view of a floor jack with stabilizing structure in accordance with the present invention.

With reference now to the drawings, and particularly to FIG. 1, there is shown an exploded perspective view of a floor jack with stabilizing structure 1. With reference to FIGS. 2–4, the floor jack with stabilizing structure 1 includes a floor jack 10, a stabilizer structure 12, a return device 14, a lifting lever 16, a safety pin 18, and a platform assembly 20. The floor jack 10 includes a hydraulic cylinder 39, a lifting ram 42, a pumping device 41, and ram cradle 52. The hydraulic cylinder 39 is pivotally attached to the lifting ram 42. The ram cradle 52 is pivotally attached to an end of the lifting ram 42. The pumping device 41 causes a rod 43 to actuate outward from the hydraulic cylinder 39. Actuation of the rod 43 causes the ram cradle 52 to move upward with a load. A lifting handle 45 is preferably attached to a rear of the floor jack 10. The floor jack 10 is of the type for lifting automobiles and preferably has a lifting capacity of at least two tons, and is commonly available from any retail store selling automobile parts and accessories. The floor jack 10 utilizes direct fluid transfer.

The stabilizer structure 12 preferably includes a first perimeter member 22, a second perimeter member 24, a plurality of structural supports 26, and a junction plate 28. One end of the first perimeter member 22 is attached to a first side of the floor jack 10 and the other end is attached to a front thereof. One end of the second perimeter member 24 is attached to a second side of the floor jack 10 and the other end is attached to a front thereof. The junction plate 28 is inserted between and attached to the first and second perimeter members and also to the front of the floor jack 10.

At least two structural supports 26 are attached to the first perimeter member 22 and the first side of the floor jack 10. At least two structural supports 26 are attached to the second perimeter member 24 and the second side of the floor jack 10. The first and second perimeter members, structural supports 26, junction plate 28, and floor jack 10 are preferably joined to each other with welding or any suitable attachment method. The stabilizer structure should not be limited to that disclosed, but may include any suitable shape or design which provides stability to the floor jack 10.

A first screw jack 29 is preferably threaded into the junction plate 28. A second screw jack 31 is preferably attached to the first perimeter member 22 and a third screw jack 33 is preferably attached to the second perimeter member 24. The first, second and third screw jacks include a threaded body 70, a swivel foot 72, and a tensions rod 74. A hole is formed through the first end of the threaded body 70 to slid ably receive the tensions rod 74. The swivel foot 72 is pivotally attached to a second end of the threaded body 70. The threaded body 70 is threaded into the junction plate 28 for the first screw jack 29. A first threaded boss 76 is attached to the first perimeter member 22 to thread ably engage the second screw jack 31. A second threaded boss 78 is attached to the second perimeter member 24 to thread ably engage the third screw jack 33.

Preferably, a first handle 80 is attached to the first perimeter member 22 and a second handle 82 is attached to the second perimeter member 24. The first and second handles may be of any type and attached with any suitable fastening method. A pair of snap clips 84 are preferably attached to two of the structural supports 26. The pair of snap clips 84 are sized to retain the lifting lever 16 for storage purposes.

The return device 14 includes a loop 32, an elastic member 34, and a pin 36. The elastic member 34 is preferably an extension spring. The pin 36 is preferably attached to each side of the floor jack 10. The loop 32 is attached to a top of the lever receptacle 38. One end of the elastic member 34 is attached to the pin 36 and the other end of the elastic member 34 is attached to the loop 32. The return device 14 pulls the lifting lever upward after thereof is depressed to elevate the platform assembly 20. The return device 14 allows the platform assembly 20 to be elevated with one foot, leaving both hands free to manipulate a load. Other suitable return devices may be used in place of the return device 14.

At least one hole 40 is formed through a lifting ram 42 of the floor jack 10. The at least one hole 40 is sized to receive a safety pin 18. The safety pin 18 is inserted through one of the holes 40 to prevent injury from a hydraulic cylinder failure.

The platform assembly 20 preferably includes a support member 46, a platform 48, and at least two eye bolts 50. The platform 48 preferably has two turned down sides 49. At least two rubber strips 44 are attached to a top of the platform 48 to prevent the bottom of a load from being scratched. The support member 46 is preferably an angle iron which is attached to a top of a ram cradle 52 with welding or any other suitable attachment method. A pair of studs 54 preferably extend downward from a bottom of the platform 48. A pair of holes are formed in the support member 46 to receive the pair of studs 54. Any suitable nut 56 may be tightened against the support member 46 to retain the platform 48 against the support member 46. Each of the eye bolts 50 is preferably attached to a side of the platform 48 with a pair of nuts 58.

Figure 5:
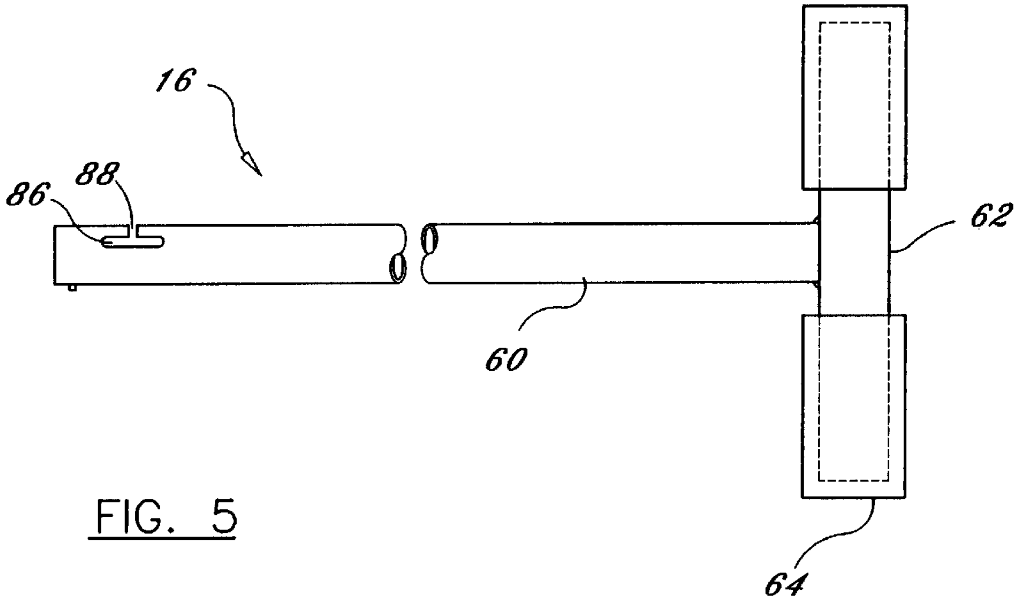
FIG. 5 is a top view of a lifting lever of a floor jack with stabilizing structure in accordance with the present invention.

FIG. 5 shows a top view of the lifting lever 16. The lifting lever 16 preferably includes a lifting rod 60, a cross member 62, and a pair of handle grips 64. The lifting rod 60 is preferably the lifting rod normally supplied with the floor jack 10. The cross member 62 is attached to the end of the lifting rod 60 which is not inserted into the lever receptacle 38. One handle grip 64 is attached to each end of the cross member 62. The handle grips 64 provide traction for the foot or hand of an operator. A push-pull slot 86 is preferably formed through the end which is inserted into the lever receptacle 38. An access slot 88 provides access to the push-pull slot 86. The first or second handles may be inserted into the push-pull slot 86 which allows the floor jack with stabilizing structure 1 to be pushed or pulled from one location to another with the lifting lever 16. The first and second handles are preferably structured to fit in the access and push-pull slots.

Figure 6:
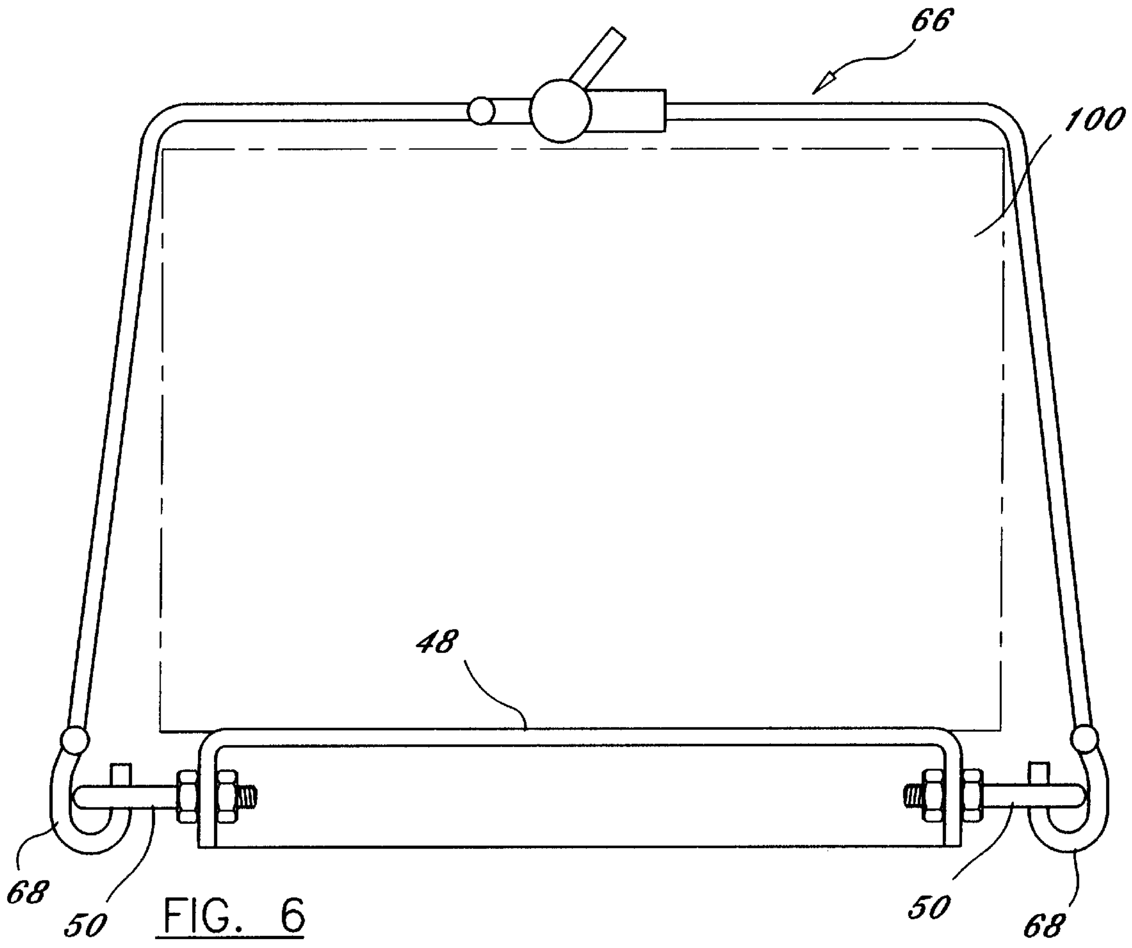
FIG. 6 is a side view of a ratchets strap attached to a pair of eye bolts while holding down a load in accordance with the present invention.

FIG. 6 shows a ratchets strap 66 retaining a load 100 against the platform 48. Each end of the ratchets strap 66 has a hook 68 which is retained by one eye bolt 50.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A floor jack with stabilizer comprising:

said floor jack having a hydraulic cylinder, a lifting ram, a pumping device and a lifting lever, said hydraulic cylinder elevating said lifting ram when said lifting lever extending from said pumping device is pushed downward; and a stabilizer structure including a first perimeter member, a second perimeter member, and at least two structural supports, said first perimeter member being attached to a front and first side of said floor jack, said second perimeter member being attached to a front and second side of said floor jack, at least one support member being attached to said first support member and said first side of said floor jack, at least one support member being attached to said second support member and said second side of said floor jack.

2. The floor jack with stabilizer comprising of claim 1, further comprising:

a return device for returning said lifting lever to an upright position after said lifting lever has been depressed.

3. The floor jack with stabilizer comprising of claim 2, further comprising:

said return device including a spring, a loop, and a pin, said spring having a first end and a second end;

said pumping device having a lever receptacle for retaining said lifting lever, said loop being attached to a top of said lever receptacle; and a pin being inserted through said each side of said floor jack, said first end of said spring being attached to said pin and said second end of said spring being attached to said loop.

4. The floor jack with stabilizer comprising of claim 1, further comprising:

a ram cradle being disposed at an end of said lifting ram; and a platform being attached to a top of said ram cradle.

5. The floor jack with stabilizer comprising of claim 4, further comprising:

at least one eye bolt being attached to each side of said platform; and a ratchets strap having hooks on each end thereof, said hooks being fasten able to said eye bolts for retention of a load against said platform.

6. The floor jack with stabilizer comprising of claim 1, further comprising:

a first screw jack being attached to said front of said floor jack, a second screw jack being attached to said first perimeter member, a third screw jack being attached to said second perimeter member.

7. The floor jack with stabilizer comprising of claim 6, further comprising:

said lifting lever including a lifting rod, a cross member, and a pair of handle grips, said cross member being attached to an end of said lifting rod, each said handle grip being attached to each end of said cross member, said handle grip providing traction for foot actuation of said lifting lever.

8. The floor jack with stabilizer comprising of claim 1, further comprising:

at least one hole being formed through said lifting ram;

a safety pin being capable of being inserted through said at least one hole to prevent injury from a hydraulic cylinder failure.

9. A floor jack with stabilizer comprising:

said floor jack having a hydraulic cylinder, a lifting ram, a pumping device, and a ram cradle, said hydraulic cylinder elevating said lifting ram when said lifting lever extending from said pumping device is pushed downward, said ram cradle being disposed at an end of said lifting ram;

a stabilizer structure including a first perimeter member, a second perimeter member, and at least two structural supports, said first perimeter member being attached to a front and first side of said floor jack, said second perimeter member being attached to a front and second side of said floor jack, at least one support member being attached to said first support member and said first side of said floor jack, at least one support member being attached to said second support member and said second side of said floor jack;

a return device for returning said lifting lever to an upright position after said lifting lever has been depressed; and a platform being attached to a top of said ram cradle.

10. The floor jack with stabilizer comprising of claim 9, further comprising:

said return device including a spring, a loop, and a pin, said spring having a first end and a second end;

said pumping device having a lever receptacle for retaining said lifting lever, said loop being attached to a top of said lever receptacle; and a pin being inserted through said each side of said floor jack, said first end of said spring being attached to said pin and said second end of said spring being attached to said loop.

11. The floor jack with stabilizer comprising of claim 9, further comprising:

at least one eye bolt being attached to each side of said platform; and a ratchets strap having hooks on each end thereof, said hooks being fasten able to said eye bolts for retention of a load against said platform.

12. The floor jack with stabilizer comprising of claim 9, further comprising:

a first screw jack being attached to said front of said floor jack, a second screw jack being attached to said first perimeter member, a third screw jack being attached to said second perimeter member.

13. The floor jack with stabilizer comprising of claim 9, further comprising:

said lifting lever including a lifting rod, a cross member, and a pair of handle grips, said cross member being attached to an end of said lifting rod, each said handle grip being applied to each end of said cross member, said handle grip providing traction for foot actuation of said lifting lever.

14. The floor jack with stabilizer comprising of claim 9, further comprising:

at least one hole being formed through said lifting ram;

a safety pin being capable of being inserted through said at least one hole to prevent injury from a hydraulic cylinder failure.

15. A floor jack with a return device comprising;

a floor jack having a hydraulic cylinder, a lifting ram, a pumping device, and a ram cradle, said hydraulic cylinder elevating said lifting ram when said lifting lever extending from said pumping device is pushed downward, said ram cradle being disposed at an end of said lifting ram; and a return device including an elastic member, said elastic member having a first end and a second end, said first end of said elastic member being attached to a body of said floor jack, said second end of said elastic member being attached to said pumping device such that said lifting lever returns to an upright position after said lifting lever of is pushed down; and a stabilizer structure extending from each side and a front of said hydraulic floor jack.

16. The floor jack with a return device of claim 15, further comprising:

a platform being attached to a top of said ram cradle.

17. The floor jack with a return device of claim 15, further comprising:

at least one eye bolt being attached to each side of said platform; and a ratchets strap having hooks on each end thereof, said hooks being fasten able to said eye bolts for retention of a load against said platform.

18. The floor jack with a return device of claim 15, further comprising:

said stabilizer structure including a first perimeter member, a second perimeter member, and at least two structural supports, said first perimeter member being attached to a front and first side of said floor jack, said second perimeter member being attached to a front and second side of said floor jack, at least one support member being attached to said first support member and said first side of said floor jack, at least one support member being attached to said second support member and said second side of said floor jack.

19. The floor jack with a return device of claim 18, further comprising:

a first screw jack being attached to said front of said floor jack, a second screw jack being attached to said first perimeter member, a third screw jack being attached to said second perimeter member.

20. The floor jack with a return device of claim 15, further comprising:

said return device including a loop, and a pin, said elastic member being a spring, said spring having a first end and a second end;

said pumping device having a lever receptacle for retaining said lifting lever, said loop being attached to a top of said lever receptacle; and a pin being inserted through said each side of said floor jack, said first end of said spring being attached to said pin and said second end of said spring being attached to said loop.

21. The floor jack with a return device of claim 15, further comprising:

said lifting lever including a lifting rod, a cross member, and a pair of handle grips, said cross member being attached to an end of said lifting rod, each said handle grip being applied to each end of said cross member, said handle grip providing traction for foot actuation of said lifting lever.

22. The floor jack with a return device of claim 15, further comprising:

at least one hole being formed through said lifting ram; a safety pin being capable of being inserted through said at least one hole to prevent injury from a hydraulic cylinder failure.

* * * * *